United States Patent
Tsukada et al.

(10) Patent No.: US 7,255,213 B2
(45) Date of Patent: Aug. 14, 2007

(54) CLUTCH DEVICE

(75) Inventors: Yoshiaki Tsukada, Wako (JP);
Kazuhiko Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 11/043,801

(22) Filed: Jan. 25, 2005

(65) Prior Publication Data
US 2005/0167229 A1 Aug. 4, 2005

(30) Foreign Application Priority Data
Feb. 3, 2004 (JP) ............................. 2004-026267

(51) Int. Cl.
F16D 13/00 (2006.01)
F16D 43/21 (2006.01)
(52) U.S. Cl. .................. 192/35; 192/54.52; 192/93 A
(58) Field of Classification Search ............. 192/54.52, 192/70.23, 89.24
See application file for complete search history.

(56) References Cited
U.S. PATENT DOCUMENTS
2,588,495 A * 3/1952 Dodge .......................... 192/35
4,645,049 A * 2/1987 Matsuda et al. ............... 192/35
5,505,285 A * 4/1996 Organek ........................ 192/35
6,637,569 B1 * 10/2003 Organek et al. .............. 192/35
6,691,845 B2 * 2/2004 Showalter ..................... 192/35
2001/0011622 A1 * 8/2001 Arai et al. ..................... 192/35

FOREIGN PATENT DOCUMENTS
JP  62-49494  10/1987

* cited by examiner

Primary Examiner—Rodney H. Bonck
(74) Attorney, Agent, or Firm—Hamre, Schumann, Mueller & Larson, P.C.

(57) ABSTRACT

In an embodiment, the invention includes a clutch device including a first friction clutch disposed between an input member and an output member, a second friction clutch adapted to go into a power cut-off state upon exertion thereon of a clutch releasing force, and a torque cam mechanism disposed between the first and second friction clutches. In an embodiment, the invention can decrease the number of clutch parts, simplify the clutch structure, and make the clutch device compact. First and second friction clutches can be constructed with a clutch outer common to both, and a torque cam mechanism is disposed within the clutch outer and between the first and second friction clutches.

8 Claims, 6 Drawing Sheets

CLUTCH DEVICE

FIELD OF THE INVENTION

The present invention relates to a clutch device capable of reducing a clutch operating force. Particularly, the present invention is concerned with a clutch device including a first friction clutch disposed between an input member and an output member, a second friction clutch disposed adjacent the first friction clutch which goes into a power cut-off state upon exertion thereon of a clutch releasing force, and a torque cam mechanism disposed between the first and second friction clutches in such a manner that the state of the first friction clutch is changed from the power cut-off state to a power transfer state upon occurrence of a relative rotation difference between the input member and the output member.

BACKGROUND OF THE INVENTION

In such a clutch device, a large transfer torque is obtained while diminishing the spring load of a clutch spring to diminish the clutch operating force. This is already known in Japanese Patent Laid-open No. Sho 62-49494. However, in the clutch device disclosed in this reference, a first friction clutch has an outer clutch connected to a rotating member, a second friction clutch has an outer clutch, separately from the outer clutch of the first friction clutch, connected to a clutch shaft so as to be incapable of relative rotation, and a torque cam mechanism is disposed between a pressure plate of the first friction clutch and a clutch outer of the second friction clutch. Thus, not only is the number of parts relatively large, but the structure is also complicated and the clutch device becomes large-sized in the direction of its axis. Therefore, a need exists for a clutch device capable of reducing the number of parts, simplifying the structure, and attaining a compact structure.

SUMMARY OF THE INVENTION

In an embodiment of the invention, there is provided a clutch device including a first friction clutch disposed between an input member and an output member, a second friction clutch disposed adjacent the first friction clutch which goes into a power cut-off state upon exertion thereon of a clutch releasing force, and a torque cam mechanism disposed between the first and second friction clutches in such a manner that the state of the first friction clutch is changed from the power cut-off state to a power transfer state upon occurrence of a relative rotation difference between the input member and the output member, wherein the first and second friction clutches are constructed with a clutch outer common to both, and the torque cam mechanism is disposed between the first and second friction clutches within the clutch outer.

In an embodiment of the invention, the torque cam mechanism is constructed so that the diameter thereof is smaller than the inside diameter of clutch discs of the first and second friction clutches.

In an embodiment of the invention, the second friction clutch includes a clutch center capable of relative rotation with respect to the clutch outer, a second pressure plate incapable of relative rotation with respect to the clutch center, and a single clutch disc engaged with the clutch outer so as to be incapable of relative rotation with respect to the clutch outer and disposed between the clutch center and the second pressure plate.

In an embodiment of the invention, the clutch device further includes a clutch release mechanism for bringing the second friction clutch into the power cut-off state, wherein the clutch release mechanism is constructed so as to pull a lifter plate connected to the second pressure plate provided in the second friction clutch toward the cover which covers the second friction clutch in accordance with rotation of a lifter shaft which is supported rotatably by the cover.

In an embodiment of the invention, the torque cam mechanism disposed between a first pressure plate provided in the first friction clutch and the clutch center provided in the second friction clutch includes a torsion spring which urges the first pressure plate and the clutch center to the side where a relative rotation phase difference between the first pressure plate and the clutch center is restored to the original state.

In an embodiment of the invention, the torque cam mechanism includes a pair of mutually opposed cam plates fixed respectively to the first pressure plate provided in the first friction clutch and the clutch center provided in the second friction clutch and a spherical body interposed between the cam plates, wherein cam surfaces for contact with the spherical body are formed on the mutually opposed surfaces of the cam plates so that a thrust developed at the time of torque transfer from the output member to the input member becomes smaller than a thrust developed at the time of torque transfer from the input member to the output member.

DETAILED DESCRIPTION OF THE INVENTION

In an embodiment of the invention, there is provided a clutch device including a first friction clutch disposed between an input member and an output member, a second friction clutch disposed adjacent the first friction clutch which goes into a power cut-off state upon exertion thereon of a clutch releasing force, and a torque cam mechanism disposed between the first and second friction clutches in such a manner that the state of the first friction clutch is changed from the power cut-off state to a power transfer state upon occurrence of a relative rotation difference between the input member and the output member, wherein the first and second friction clutches are constructed with a clutch outer common to both, and the torque cam mechanism is disposed between the first and second friction clutches within the clutch outer. Since the clutch outer can be disposed in common to both first and second friction clutches, it is possible not only to reduce the number of parts and simplify the structure, but also to make the whole of the clutch device compact in the direction of a rotation axis.

In an embodiment of the invention, the torque cam mechanism is constructed so that the diameter thereof is smaller than the inside diameter of clutch discs of the first and second friction clutches. Since the torque cam mechanism can be constructed so that the diameter thereof is smaller than the inside diameter of clutch discs provided in the first and second friction clutches, the first and second friction clutches can be disposed closer to each other in the axial direction and hence the clutch device can be made compact in its axial direction.

In an embodiment of the invention, the second friction clutch includes a clutch center capable of relative rotation with respect to the clutch outer, a second pressure plate incapable of relative rotation with respect to the clutch center, and a single clutch disc engaged with the clutch outer so as to be incapable of relative rotation with respect to the clutch outer and disposed between the clutch center and the second pressure plate. The operation stroke of the second pressure plate can be minimized to provide a sufficient lever ratio and diminish the clutch operating load.

In an embodiment of the invention, the clutch device further includes a clutch release mechanism for bringing the second friction clutch into the power cut-off state, wherein the clutch release mechanism is constructed so as to pull a lifter plate connected to the second pressure plate provided in the second friction clutch toward the cover which covers the second friction clutch in accordance with rotation of a lifter shaft which is supported rotatably by the cover. Since the clutch operating force can be small, it is possible to lighten the load imposed on the cover, allowing a decrease in the cover thickness and the number of reinforcing ribs, thereby reducing the weight of the cover.

In an embodiment of the invention, the torque cam mechanism disposed between a first pressure plate provided in the first friction clutch and the clutch center provided in the second friction clutch includes a torsion spring which urges the first pressure plate and the clutch center to the side where a relative rotation phase difference between the first pressure plate and the clutch center is restored to the original state. In an off condition, a relative position of the first pressure plate and the clutch center is restored to an initial position to enhance the clutch operation responsiveness.

In an embodiment of the invention, the torque cam mechanism includes a pair of mutually opposed cam plates fixed respectively to the first pressure plate provided in the first friction clutch and the clutch center provided in the second friction clutch and a spherical body interposed between the cam plates, wherein cam surfaces for contact with the spherical body are formed on the mutually opposed surfaces of the cam plates so that a thrust developed at the time of torque transfer from the output member to the input member becomes smaller than a thrust developed at the time of torque transfer from the input member to the output member. It is possible to decrease a back torque from the output member side to the input member side.

Embodiments of the present invention will be described hereinunder with reference to the accompanying drawings. First, in FIG. 1, a four-cylinder engine E mounted for example on a motorcycle includes a crank case 12 which supports a crank shaft 11 rotatably, a cylinder block 13 connected to the crank case 12, a cylinder head 14 connected to the cylinder block 13, and a head cover 15 connected to the cylinder head 14. Four cylinder bores 16 arranged in parallel with the axis of the crank shaft 11 are formed in the cylinder block 13 and pistons 17, which are slidably fitted in the cylinder bores 16 respectively, are connected to the crank shaft 11 through connecting rods 18.

Figure 1:
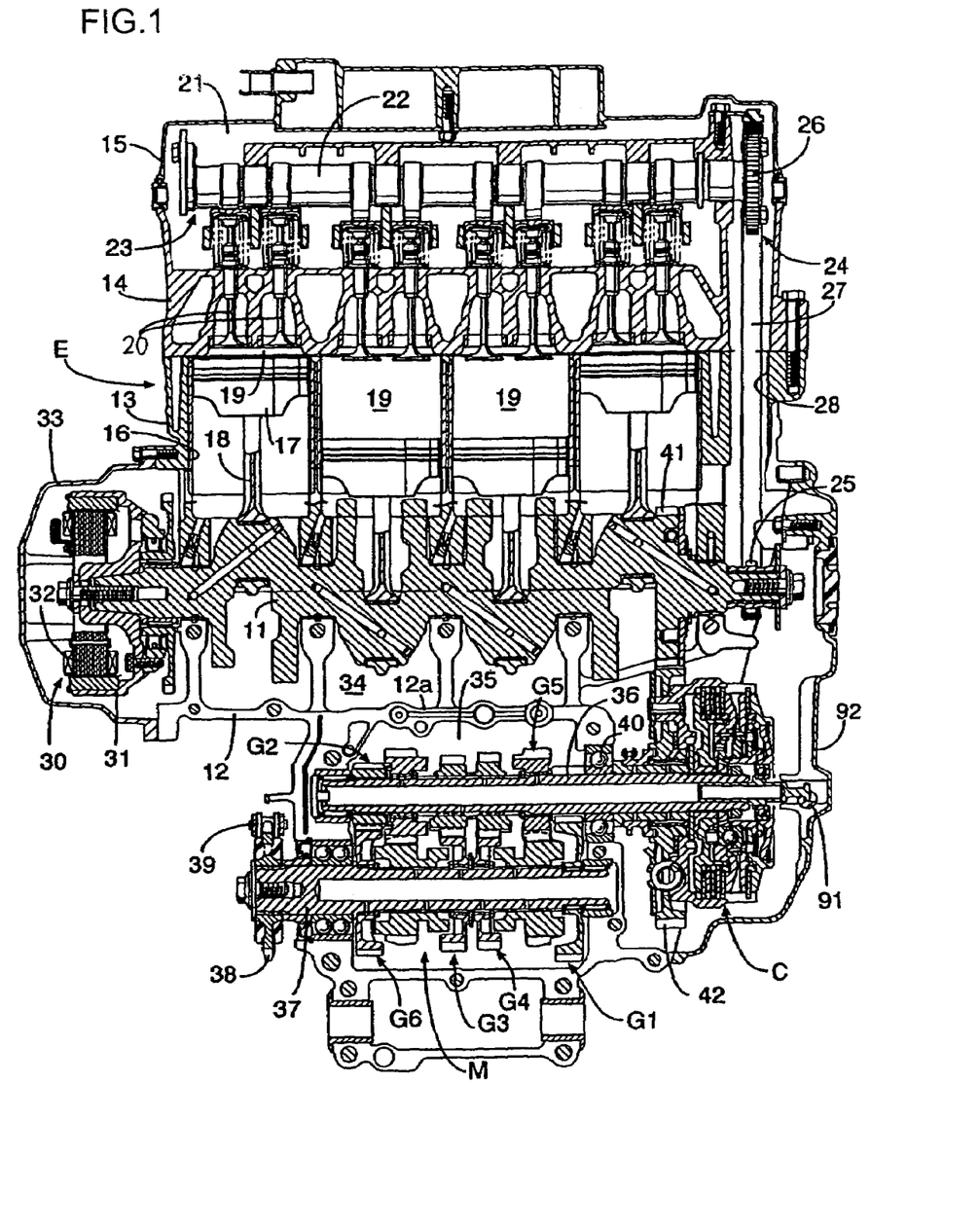
FIG. 1 is a cross-sectional view of an engine and a transmission both mounted on a motorcycle.

Combustion chambers 19 are formed between the cylinder block 13 and the cylinder head 14 so that top portions of the pistons 17 face the combustion chambers 19 respectively. A pair of intake valves 20 are disposed on the cylinder head 14 for each combustion chamber 19 for opening and closing motions to control the admission of an air-fuel mixture into each combustion chamber 19. Likewise, a pair of exhaust valves (not shown) are disposed for each combustion chamber 19 for opening and closing motions to control the discharge of combustion gas from each combustion chamber. A valve operating mechanism 23 including an intake-side cam shaft 22 for opening and closing the intake valves 20 and an exhaust cam shaft (not shown) for opening and closing the exhaust valves is installed within a valve operating chamber 21 formed between the cylinder head 14 and the head cover 15.

A rotating power from the crank shaft 11 is transferred to the intake-side cam shaft 22 and the exhaust-side cam shaft at a reduction gear ratio of 1/2 through an engine timing power transfer mechanism 24. The engine timing power transfer mechanism 24 includes a driving sprocket 25 fixed to one end of the crank shaft 11, a driven sprocket 26 fixed to one end of the intake-side cam shaft 22, a driven sprocket (not shown) fixed to one end of the exhaust-side cam shaft, and an endless timing chain 27 entrained on those sprockets 26. A chain chamber 28 for travel of the timing chain 27 is formed within the crank case 12, cylinder block 13 and cylinder head 14.

A rotor 31 is connected to an opposite end of the crank shaft 11 projecting from the crank case 12, and a stator 32 which constitutes a generator 30 in cooperation with the rotor 31 is fixed to a generator cover 33, the generator 33 being clamped to the crank case 12 so as to cover the generator 30.

A crank chamber 34 which houses therein the greater part of the crank shaft 11 and a transmission chamber 35 are formed within the crank case 12 so as to be partitioned from each other through a partition wall 12a. A transmission M is installed within the transmission chamber 35, the transmission M including a main shaft 36 as an output member disposed in parallel with the crank shaft 11 and supported by the crank case 12 rotatably, a counter shaft 37 disposed in parallel with the main shaft 36 and supported by the crank case 12 rotatably, and first to sixth shift gear trains G1 to G6 capable of being established in an alternative manner and disposed between the main shaft 36 and the counter shaft 37.

The rotating power from the crank shaft 11 is transferred to one end side of the main shaft 36 through a driving gear 41 disposed near one end of the crank shaft 11, a driven gear 42 as an input member supported by the main shaft 36 rotatably and meshing with the driving gear 41, and a clutch device C according to the present invention which is disposed between the driven gear 42 and the main shaft 36 so as to function as a starting clutch. An output sprocket 38 is fixed to an end portion of the counter shaft 37 projecting from the crank case 12 on the side opposite to the clutch device C. An endless chain 39 for transmitting power to a rear wheel (not shown) is entrained on the output sprocket 38.

Figure 2:
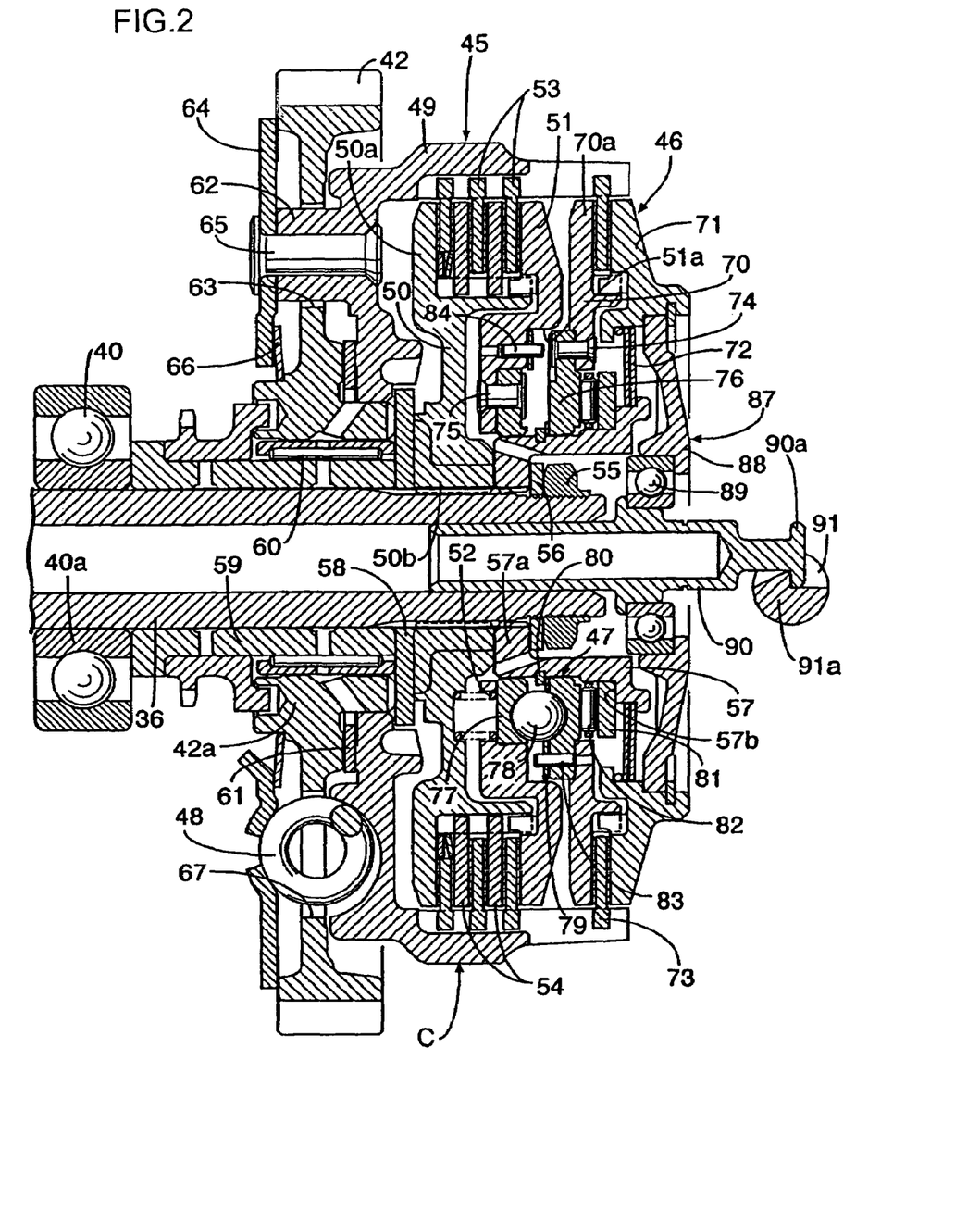
FIG. 2 is an enlarged view of a principal portion of FIG. 1.

In FIG. 2, the clutch device C includes a first friction clutch 45 disposed between the coaxial driven gear 42 and main shaft 36, a second friction clutch 46 which is disposed along the axis of the main shaft 36 at a position adjacent to the first friction clutch 45 while going into a power cut-off state upon exertion thereon of a clutch releasing force, and a torque cam mechanism 47 disposed between the first and second friction clutches 45, 46 so as to change the state of the first friction clutch 45 from a power cut-off state to a power transfer state upon occurrence of a relative rotation difference between the driven gear 42 and the main shaft 36.

The first friction clutch 45 includes a clutch outer 49 which is connected to the driven gear 42 through plural damper springs 48, a first clutch center 50 connected to the main shaft 36 so as to be incapable of relative rotation, a first pressure plate 51 capable of moving toward and away from a first pressure receiving plate portion 50a provided in the first clutch center 50, the first pressure plate 51 being engaged with the first clutch center 50 so as to be incapable of relative rotation, a return spring 52 which urges the first pressure plate 51 in a direction away from the first pressure receiving plate portion 50a, plural driving clutch discs 53 disposed between the first pressure receiving plate portion 50a and the first pressure plate 51 and engaged with the clutch outer 49 so as to be incapable of relative rotation, and plural driven clutch discs 54 disposed between the first pressure receiving plate portion 50a and the first pressure plate 51 and alternately with the driving clutch discs 53.

The ball bearing 40 is interposed between one end side of the main shaft 36 and the crank case 12 in between an inner race 40a of a ball bearing 40 and a nut 55 threadedly engaged with one end of the main shaft 36, there are sandwiched, successively from the nut 55 side, a first spacer 56, a boss 57a of a support cylinder 57, a boss 50b of the first clutch center 50, a second spacer 58, and a cylindrical sleeve 59 which encloses the main shaft 36 coaxially. The boss 57a of the support cylinder 57 and the boss 50b of the first clutch center 50 are spline-fitted to the main shaft 36. That is, the support cylinder 57 and the first clutch center 50 are connected to the main shaft 36 so as to be incapable of relative rotation. The boss 42a of the driven gear 42 is supported by the sleeve 59 rotatably through a needle bearing 60.

The clutch outer 49, which is formed in a cylindrical shape, has an end wall 49a with an annular slip plate 61 being interposed between it and the driven gear 42, the end wall 49a being formed at an end portion on the driven gear 42 side. Connecting bosses 62 are formed projecting at plural positions in the circumferential direction of the end wall 49a. On the other hand, in the driven gear 42 there are formed plural long holes 63 extending long in the circumferential direction in circumferentially spaced positions, and the connecting bosses 62 are inserted through the long holes 63. Besides, a holding plate 64 opposed to a side face of the driven gear 42 on the side opposite to the end wall 49a of the clutch outer 49 is in abutment against end faces of the bosses 62. The holding plate 64 is fixed to the end faces of the connecting bosses 62 by means of rivets 65 extending through the bosses 62. A disc spring 66 which produces a spring force for urging the driven gear 42 and the end wall 49a into contact with both faces the slip plate 61 is disposed between the holding plate 64 and the driven gear 42.

Circumferentially long holding holes 67 are formed in the driven gear 42 in plural positions which are circumferentially dislocated from the long holes 63, and the damper springs 48 interposed between the clutch outer 49, the holding plate 64 and the driven gear 42 are received within the holding holes 67.

The first clutch center 50 and the first pressure plate 51 are covered with the clutch outer 49. The annular, first pressure receiving plate portion 50a is integral with an outer periphery portion of the first clutch center 50, and the first pressure plate 51 capable of moving toward and away from the first pressure receiving plate portion 50a is engaged with the first clutch center 50 so as to be incapable of relative rotation.

The second friction clutch 46 includes at least the clutch outer 49 which is common to the first friction clutch 45, a second clutch center 70 opposed to the first pressure plate 51 so as to be capable of relative rotation with respect to the main shaft 36, a second pressure plate 71 engaged with the second clutch center 70 so as to be incapable of relative rotation while being able to move toward and away from the second pressure receiving portion 70a provided in the second clutch center 70, the second pressure plate 71 being urged toward the second pressure receiving plate portion 70a by means of a clutch spring 72, and a clutch disc 73 engaged with the clutch outer 49 so as to be incapable of relative rotation and disposed between the second pressure receiving plate portion 70a and the second pressure plate 71. In this embodiment, the clutch disc 73 is a single disc, which is engaged with the clutch outer 49 so as to be incapable of relative rotation, is disposed between the second pressure receiving plate portion 70a and the second pressure plate 71. The clutch spring 72 is a disc spring and is disposed between the support cylinder 57 and the second pressure plate 71.

Figure 3:
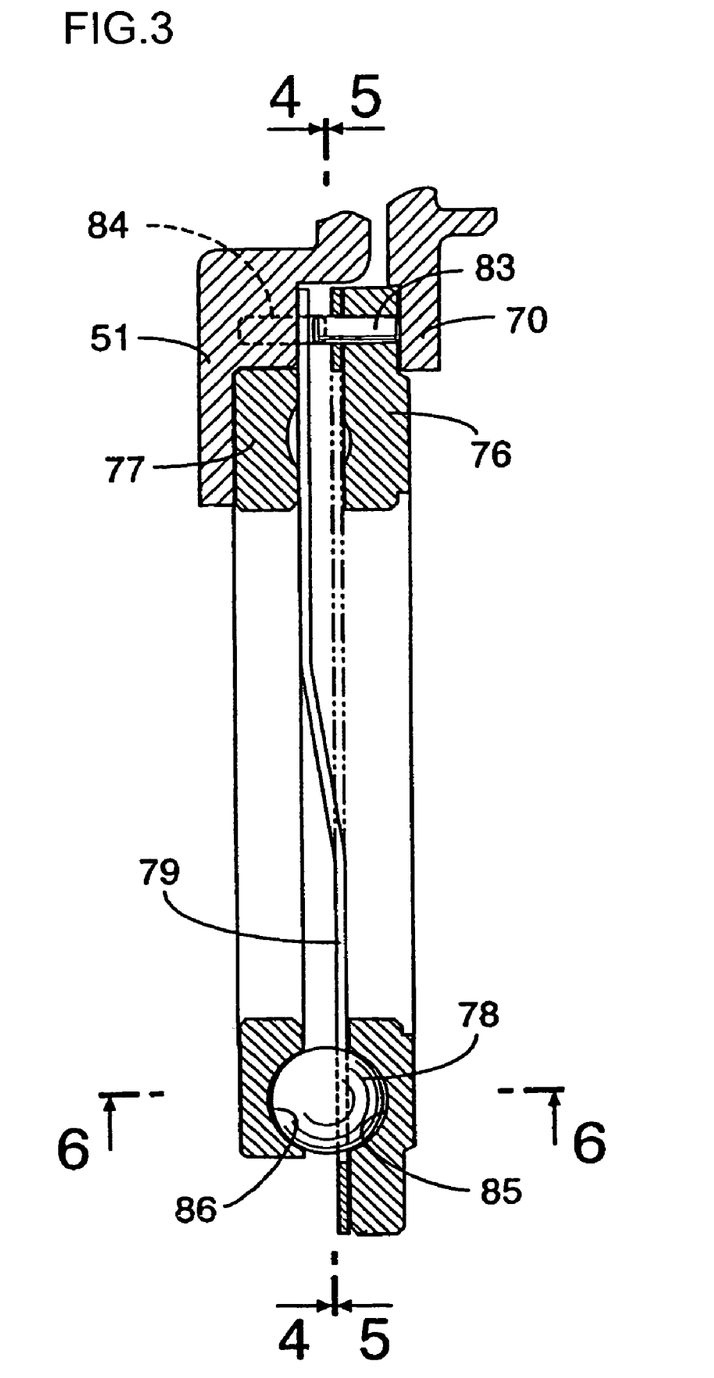
FIG. 3 is a vertical sectional view of a torque cam mechanism, taken along line 3-3 in FIG. 4.
Figure 4:
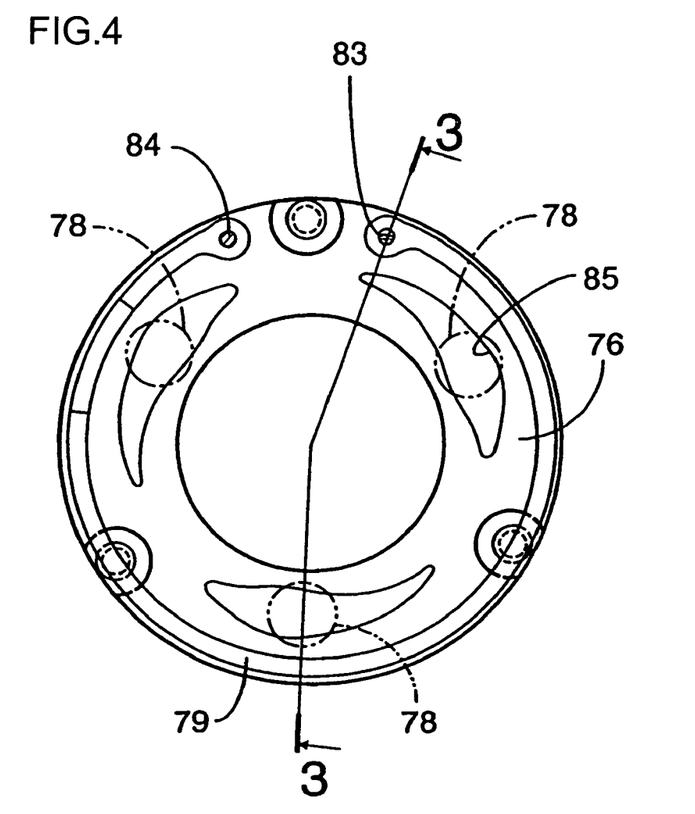
FIG. 4 is a view of a cam plate on a second friction clutch side and a torsion spring as seen in the direction of arrow 4-4 in FIG. 3.
Figure 5:
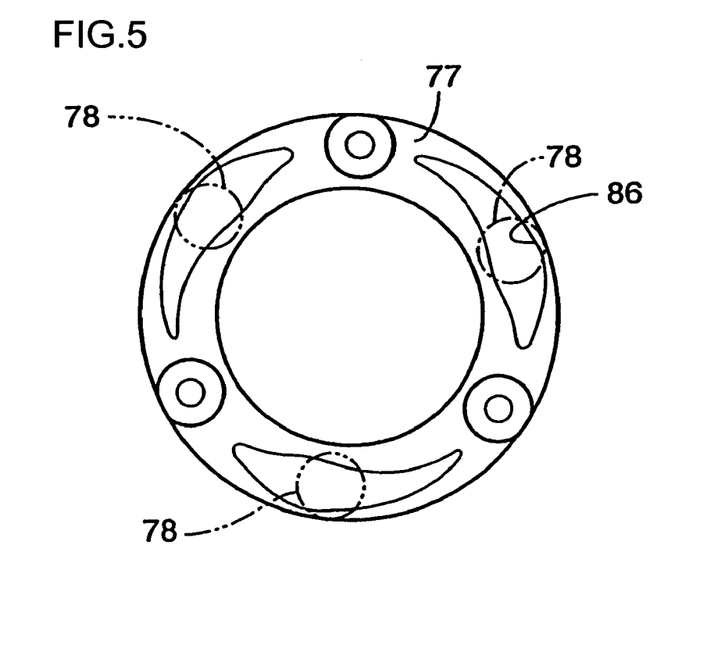
FIG. 5 is a view of a cam plate on a first friction clutch side as seen in the direction of arrows 4-4 in FIG. 3.

Referring also to FIGS. 3 to 5, the torque cam mechanism 47 is disposed between the first pressure plate 51 and the second clutch center 70 so as to develop a thrust for pushing the first pressure plate 51 toward the first pressure receiving plate portion 50a in accordance with a relative rotation of the first pressure plate 51 and the second clutch center 70. The torque cam mechanism 47 includes an annular cam plate 76 which is connected to an inner periphery portion of the second clutch center 70 by means of plural rivets 74, a cam plate 77 which is connected to an inner periphery portion of the first pressure plate 51 by means of plural rivets 75, plural, e.g., three, spherical bodies 78 sandwiched in between both cam plates 76 and 77, and a torsion spring 79 for urging the first pressure plate 51 and the second clutch center 70 to the side where a relative rotation phase difference between both cam plates 77 and 76, i.e., a relative rotation phase difference between the first pressure plate 51 and the second clutch center 70, is restored to the original state. The return spring 52 which, in the first friction clutch 45, urges the first pressure plate 51 in the direction away from the first pressure receiving plate portion 50a is disposed between the first clutch center 50 and the cam plate 77 fixed to the first pressure plate 51.

The torque cam mechanism 47 is constructed so that the diameter thereof is smaller than the inside diameter of the driving and driven clutch discs 53, 54 in the first friction clutch 45 and smaller than the inside diameter of the clutch disc 73 in the second friction clutch 46. Besides, the cam plate 76 on the second friction clutch 46 side is formed so as to have such an outside diameter as permits its outer periphery portion to be inserted into a recess 51a formed in an inner periphery portion of an end face of the first pressure plate 51 on the second friction clutch 46 side. The cam plate 77 on the first friction clutch 45 side is formed smaller in diameter than the cam plate 76 and is connected to an inner periphery portion of the recess 51a.

Inner periphery portions of the cam plates 76 and 77 are supported for relative rotation by the support cylinder 57 which rotates together with the main shaft 36, and a retaining ring 80 which comes into engagement with the inner periphery portion of the cam plate 76 from the first friction cam 45 side is fitted on the support cylinder 57. The support cylinder 57 has an annular stepped portion 57b which faces the cam plate 76 from the side opposite to the first friction clutch 45, and a thrust roller bearing 82 is interposed between the annular receiving plate 81 abutted against the stepped portion 57b and the cam plate 76. That is, the cam plate 76 and the second clutch center 70 are supported for relative rotation by the support cylinder 57 while their axial movement in the axis of the main shaft 36 is prevented.

The torsion spring 79 is formed in an arcuate shape substantially along the outer periphery portion of one cam plate 76 in a state in which a relative rotation phase difference between both cam plates 76 and 77 does not occur. One end of the torsion spring 79 is connected to the cam plate 76 through a connecting pin 83, while an opposite end of the torsion spring 79 is connected through a connecting pin 84 to the first pressure plate 51 which is connected to the other cam plate 77.

Recesses 85 and 86 which receive therein portions of the spherical bodies 78 are formed in the mutually opposed faces of both cam plates 76 and 77 in the same plural number as the number of the spherical bodies 78.

Figure 6:
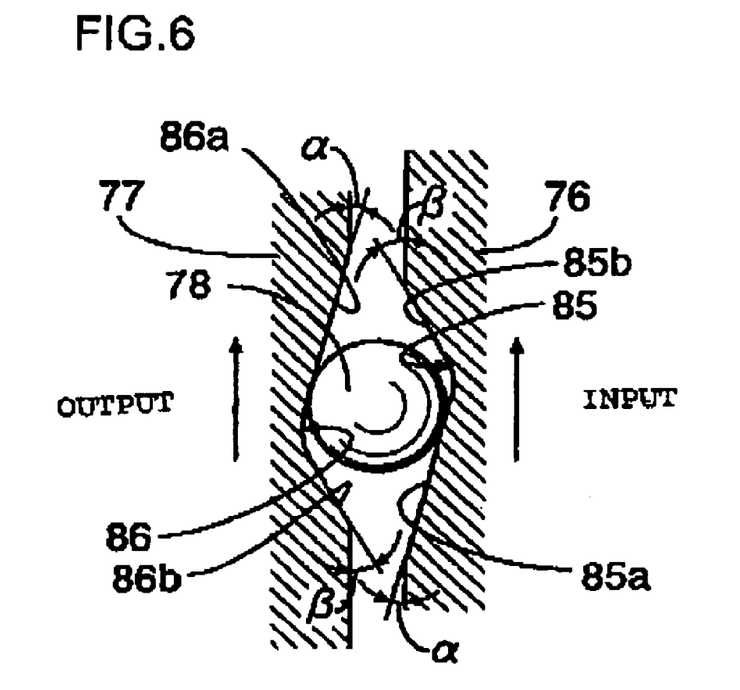
FIG. 6 is a sectional view taken on line 6-6 in FIG. 3 in a state of torque transfer from the engine to the transmission.

In FIG. 6, the recess 85 in one cam plate 76 is formed so as to become shallower from the deepest portion toward both circumferential sides. At the bottom of the recess 85, the portion on one circumferential side from the deepest portion is formed as a first cam surface 85a which is inclined at a relatively small inclination angle α, while the portion on the other circumferential side from the deepest portion is formed as a second cam surface 85b inclined at a larger inclination angle β than the inclination angle α of the first cam surface 85a.

The recess 86 in the other cam plate 77 is formed so as to become shallower toward both circumferential sides from the deepest portion. At the bottom of the recess 85, the portion on one circumferential side from the deepest portion is formed as a second cam surface 86b which is inclined at the same inclination angle β as that of the second cam surface 85b of the cam plate 76, while the portion on the other circumferential side from the deepest portion is formed as a first cam surface 86a inclined at the same inclination angle α as that of the first cam surface 85a of one cam plate 76.

As shown in FIG. 6, the first cam surfaces 85a and 86a come into contact with the spherical body 78 from both sides thereof upon occurrence of a rotation phase difference between the cam plates 76 and 77 when one cam plate 76 and the other cam plated 77 are made input side and output side respectively, that is, at the time of transfer of torque from the crank shaft 11 of the engine E to the transmission M. Since the inclination angle α of the first cam surfaces 85a and 86a is relatively small, the thrust acting on the other cam plate 77 with rotation of one cam plate 76, i.e., the force acting to push the first pressure plate 51 toward the first pressure receiving plate portion 50a of the first clutch center 50 in the first friction clutch 45, becomes relatively large.

Figure 7:
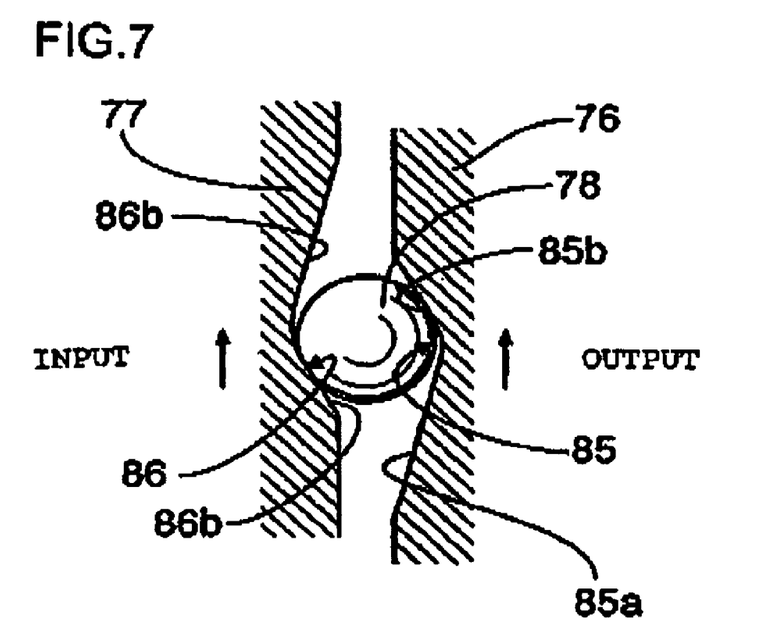
FIG. 7 is a sectional view corresponding to FIG. 6 in a state of torque transfer from the transmission to the engine.

On the other hand, as shown in FIG. 7, the second cam surfaces 85b and 86b come into contact with the spherical body 78 from both sides thereof when the other cam plate 77 and one cam plate 76 are made input side and output side respectively, i.e., at the time of transfer of a driving force from the transmission M to the crank shaft 11 of the engine E upon application of the engine brake. Since the inclination angle β of the second cam surfaces 85b and 86b is larger than the inclination angle α of the first cam surfaces 85a and 86a, the thrust which the cam plate 77 receives with rotation of the cam plate 77 becomes smaller than that generated at the time of torque transfer from the crank shaft 11 of the engine E to the transmission M.

Turning again to FIG. 2, a clutch release mechanism 87 for bringing the second friction clutch 46 into a power cut-off state includes a lifter plate 88 whose outer periphery portion is connected to the second pressure plate 71, a cylindrical lifter piece 90 which is slidably fitted on one end portion of the main shaft 36, a release bearing 89 disposed between the lifter piece 90 and an inner periphery portion of the lifter plate 88, and a lifter shaft 91 which is supported by a cover 92 so as to be pivotable in accordance with operation of a clutch lever (not shown). The cover 92 is clamped to the crank case 12 so as to cover one end portion of the crank shaft 11 and the clutch device C.

By cutting out a part of the lifter shaft 91, a generally L-shaped arm portion 91a is formed at a projecting end portion of the lifter shaft 91 projecting into the cover 92, and an engaging collar portion 90a engaged with the arm portion 91a is integral with an end portion of the lifter piece 90. When the lifter shaft 91 is pivoted by operation of the clutch lever, the lifter plate 88 is pulled toward the cover 92, whereby, in the first friction clutch 46, the second pressure plate 71 moves in a direction away from the second pressure receiving plate portion 70a against the spring force of the clutch spring 72, so that the second friction clutch 46 cuts off the transfer of power between the clutch outer 49 and the second clutch center 70.

Next, the operation of this first embodiment will be described. Upon input of a driving torque from the driven gear 42 to the clutch outer 49 through the damper springs 48 when the second friction clutch 46 is in the power cut-off state, the second clutch center 70 of the second friction clutch 46 rotates together with the clutch outer 49, but in the first friction clutch 45 upon start-up of rotation of the clutch outer 49, the first pressure plate 51 incapable of relative rotation with respect to the first clutch center 50 which is connected to the main shaft 36 so as to be incapable of relative rotation is in a standstill state, and upon occurrence of a relative rotation difference between the second clutch center 70 and the first pressure plate 51, the torque cam mechanism 47 develops a thrust for pushing the first pressure plate 51 toward the first pressure receiving plate portion 50a of the first clutch center 50. As a result, the first friction clutch 45 goes into the power transfer state and the driving force is transmitted from the driven gear 42 to the main shaft 36 through the damper springs 48 and the first friction clutch 45.

That is, it suffices for the second friction clutch 46 to display a function of only giving rise to a relative rotation difference between the first pressure plate 51 and the second clutch center 70 and thus the spring load of the clutch spring 72 can be kept relatively small. Thus, when the transfer of power between the driven gear 42 and the main shaft 36 is cut off, the operating force for operating the second pressure plate 71 of the second friction clutch 46 in the direction away from the second pressure receiving plate portion 70a against the spring force of the clutch spring 72 can be made smaller to lighten the operating load.

Besides, since the clutch outer 49 is disposed in common to both first and second friction clutches 45 and 46, it is possible not only to decrease the number of parts and thereby simplify the structure but also to make the whole of the clutch device C compact in the axial direction of the main shaft 36.

Moreover, since a single clutch disc 73 which is engaged so as to be incapable of relative rotation with respect to the clutch outer 49 is disposed between the second pressure receiving plate portion 70a of the second friction clutch 46 and the second pressure plate 71, it is possible to minimize the operation stroke of the second pressure plate 71 to provide a sufficient lever ratio and reduce the clutch operating load.

Further, since the torque cam mechanism 47 is constructed so that the diameter thereof is smaller than the inside diameter of the driving and driven clutch discs 53, 54 provided in the first friction clutch 45 and smaller than the inside diameter of the clutch disc 73 provided in the second friction clutch 46, it is possible to dispose the first and second friction clutches 45, 46 in close proximity to each other in the axial direction and hence possible to make the clutch device C compact in that axial direction.

Further, the clutch release mechanism 87 for bringing the second friction clutch 46 into the power cut-off state is constructed such that the lifter plate 88 connected to the second pressure plate 71 is pulled toward the cover 92 in accordance with a pivoting motion of the lifter shaft 91 which is supported rotatably by the cover 92, the cover 92 being clamped to the crank case 12 so as to cover the whole of the clutch device C including the second friction clutch 46 and also cover one end portion of the crank shaft 11. As mentioned above, since a small clutch operating load suffices, it is possible to lighten the load imposed on the cover 92, thus making it unnecessary to increase the thickness of the cover 92 and to increase the number of reinforcing ribs to enhance the strength, whereby it is possible to attain the reduction in weight of the cover 92.

Further, the torque cam mechanism 47 includes the torsion spring 79 for urging the first pressure plate 51 and the second clutch center 70 in the direction to restore the relative rotation phase difference between the first pressure plate 51 and the second clutch center 70 to the original state. Thus, by restoring the relative position of the first pressure plate 51 and the second clutch center 70 to the initial position with the torsion spring 79, it is possible to enhance the clutch operation responsiveness.

Further, the torque cam mechanism 47 includes a pair of mutually opposed cam plates 76 and 77 which are respectively fixed to the first pressure plate 51 and the second clutch center 70 and the spherical bodies 78 interposed between the cam plates 76 and 77. Additionally, on the mutually opposed surfaces of both cam plates 76 and 77 there are formed the first cam surfaces 85a, 86a and the second cam surfaces 85b, 86b which come into contact with the spherical bodies 78 in such a manner that the thrust of pushing the first pressure plate 51 toward the first pressure receiving plate portion 50a which thrust is developed at the time of torque transfer from the main shaft 36 to the crank shaft 11 of the engine E becomes smaller than the thrust developed at the time of torque transfer from the crank shaft 11 to the main shaft 36. Consequently, it is possible to diminish a back torque from the main shaft 36 to the crank shaft 11 upon application of the engine brake.

Figure 8:
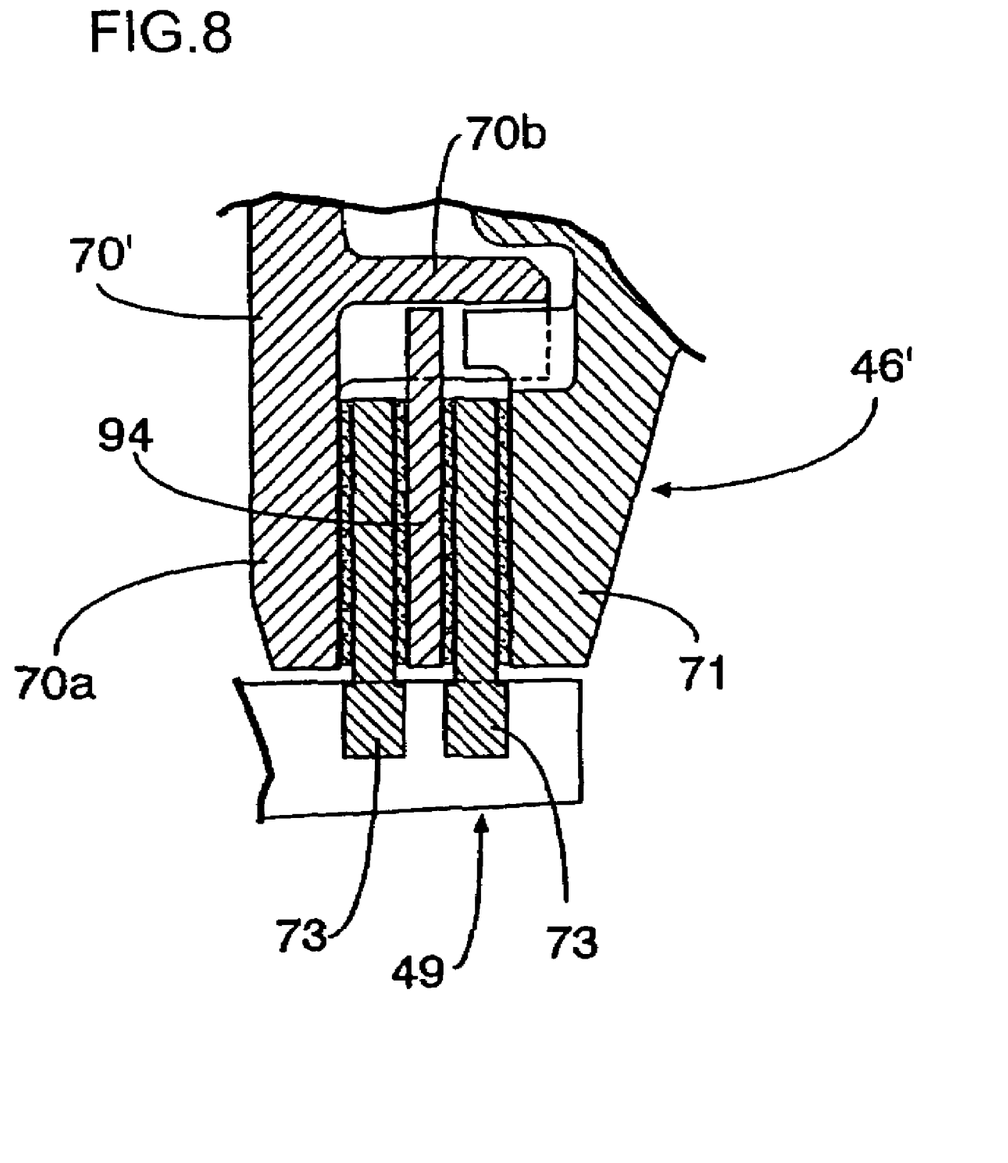
FIG. 8 is a sectional view showing a part of a second friction clutch in a second embodiment of the present invention.

FIG. 8 illustrates a second embodiment of the present invention. In this second embodiment, a second friction clutch 46' includes a clutch outer 49, a second clutch center 70', a second pressure plate 71 adapted to be urged with a spring toward a second pressure receiving plate portion 70a provided in the second clutch center 70' while being able to move toward and away from the second pressure receiving plate portion 70a, two driving clutch discs 73 engaged with the clutch outer 49 so as to be incapable of relative rotation and disposed between the second pressure receiving plate portion 70a and the second pressure plate 71, and a driven clutch disc 94 sandwiched in between both clutch discs 73 while being engaged with a cylindrical portion 70b provided in the second clutch center 70', the driven clutch disc 94 being engaged with the cylindrical portion 70b so as to be incapable of relative rotation. Likewise, the second pressure plate 71 is engaged with the cylindrical portion 70b of the second clutch center 70' so as to be incapable of relative rotation.

According to this second embodiment, with a movement-induced friction between the driven clutch disc 94 and the driving clutch discs 73, the engaging and releasing operations of the second friction clutch 46' become smooth and hence like operations of the clutch device can be made smoother although the operation stroke of the second pressure plate 71 becomes somewhat larger.

Although embodiments of the present invention have been described above, the present invention is not limited to the above embodiments, but various design modifications may be made without departing from the invention defined in the claims.

We claim:

1. A clutch device comprising:
    a first friction clutch disposed between an input member and an output member, said first friction clutch including first clutch discs and first pressure plates on opposite sides of said first clutch discs, said first clutch discs having a first inside diameter, one of said first pressure plates having a recess radially inside the first inside diameter of said first clutch discs, the first friction clutch having a power transfer state and a power cut-off state;
    a second friction clutch disposed adjacent the first friction clutch, the second friction clutch having a power transfer state and a power cut-off state, wherein the second friction clutch goes into the power cut-off state upon exertion of a clutch releasing force; and
    a torque cam mechanism disposed between the first and second friction clutches such that the first friction clutch changes from the power cut-off state to the power transfer state upon a relative rotation difference between the input member and the output member, said torque cam mechanism fitting in the recess in said one of said first pressure plates; wherein
    the first and second friction clutches comprising a clutch outer common to both, the torque cam mechanism disposed between the first and second friction clutches within the clutch outer; and wherein
    the second friction clutch includes a clutch center rotatable relative to the clutch outer, a second pressure plate not rotatable relative to the clutch center, and a second clutch disc engaged with the clutch outer not rotatable relative to the clutch outer and disposed between the clutch center and the second pressure plate.

2. The clutch device of claim 1, wherein the torque cam mechanism is disposed between a first pressure plate provided in the first friction clutch and the clutch center provided in the second friction clutch, the torque cam mechanism comprising a torsion spring which urges the first pressure plate and the clutch center to the side where a relative rotation phase difference between the first pressure plate and the clutch center is reduced.

3. The clutch device of claim 2, wherein the torque cam mechanism comprises
    a pair of mutually opposed earn plates fixed respectively to the first pressure plate provided in the first friction clutch and the clutch center provided in the second friction clutch; and
    a spherical body interposed between the cam plates;

wherein cam surfaces for contact with the spherical body are formed on the mutually opposed surfaces of the cam plates so that a thrust developed during torque transfer from the output member to the input member becomes smaller than a thrust developed during torque transfer from the input member to the output member.

4. A clutch device comprising:
a first friction clutch disposed between an input member and an output member, the first fiction clutch having a power transfer state and a power cut-off state;
a second friction clutch disposed adjacent the first friction clutch, the second friction clutch having a power transfer state and a power cut-off state, wherein the second friction clutch goes into the power cut-off state upon exertion of a clutch releasing force; and
a torque cam mechanism disposed between the first and second friction clutches such that the first friction clutch changes from the power cot-off state to the power transfer state upon a relative rotation difference between the input member and the output member; wherein
the first and second friction clutches comprising a clutch outer common to both,
the torque cam mechanism disposed between the first and second friction clutches within the clutch outer,
the second friction clutch comprising:
 a clutch center rotatable relative to the clutch outer,
 a second pressure plate not rotatable relative to the clutch center, and
 a single clutch disc engaged with the clutch outer not rotatable relative to the clutch outer and disposed between the clutch center and the second pressure plate, further comprising a clutch release mechanism for bringing the second friction clutch into the power cut-off state, wherein the clutch release mechanism is arranged so as to pull a lifter plate connected to the second pressure plate provided in the second friction clutch toward a cover which covers the second friction clutch in accordance with rotation of a lifter shaft which is supported rotatably by the cover.

5. A clutch device comprising:
a power input member;
a power output member; and
means for transferring power between the power input member and the power output member,
wherein the means for transferring power between the power input member and power output member comprises:
a first friction clutch comprising one or more first clutch disc(s) having an inside diameter, having a power transfer state and a power cut-off state;
a second friction clutch comprising one or more second clutch disc(s) having an inside diameter, having a power transfer state and a power cut-off state;
a recess radially inside the first inside diameter of said clutch disc(s);
the first and second friction clutches comprising a clutch outer common to both; and
a torque cam mechanism having a diameter that is smaller than the inside diameter of clutch disc(s) of the first and second friction clutches, said torque cam mechanism fitting in the recess disposed between the first and second friction clutches such that the first friction clutch changes from power cut-off state to the power transfer state upon a relative rotation difference between the input member and the output member, wherein the second friction clutch includes a clutch center rotatable relative to the clutch outer, a second pressure plate not rotatable relative to the clutch center, and a single of the one or more second clutch disc(s) engaged with the clutch outer not rotatable relative to the clutch outer and disposed between the clutch center and the second pressure plate.

6. The clutch device of claim 5, wherein the torque cam mechanism is disposed between a first pressure plate provided in the first friction clutch and the clutch center provided in the second friction clutch, the torque cam mechanism comprising a torsion spring which urges the first pressure plate and the clutch center to the side where a relative rotation phase difference between the first pressure plate and the clutch center is reduced.

7. The clutch device of claim 6, wherein the torque cam mechanism comprises
a pair of mutually opposed earn plates fixed respectively to the first pressure plate provided in the first friction clutch and the clutch center provided in the second friction clutch; and
a spherical body interposed between the cam plates;
wherein cam surfaces for contact with the spherical body are formed on the mutually opposed surfaces of the cam plates so that a thrust developed during torque transfer from the output member to the input member becomes smaller than a thrust developed during torque transfer from the input member to the output member.

8. A clutch device comprising:
a power input member;
a power output member;
means for transferring power between the power input member and the power output member,
 wherein the means for transferring power between the power input member and power output member comprises;
 a torque cam mechanism;
 a first friction clutch having a power transfer state and a power cut-off state;
 a second friction clutch having a power transfer state and a power cut-off state comprising:
  a clutch center rotatable relative to the clutch outer,
  a second pressure plate not rotatable relative to the clutch center, and
  a single clutch disc engaged with the clutch outer not rotatable relative to the clutch outer and disposed between the clutch center and the second pressure plate; and
 the first and second friction clutches comprising a clutch outer common to both; and
a clutch release mechanism for bringing the second friction clutch into the power cut-off state, wherein the clutch release mechanism is arranged so as to pull a lifter plate connected to the second pressure plate provided in the second friction clutch toward a cover which covers the second friction clutch in accordance with rotation of a lifter shaft which is supported rotatably by the cover.

* * * * *